United States Patent
Paulraj et al.

(10) Patent No.: US 12,164,642 B2
(45) Date of Patent: Dec. 10, 2024

(54) SMART NETWORK INTERFACE CONTROLLER SIGNATURE DATABASE EMULATION

(71) Applicant: Dell Products L.P., Round Rock, TX (US)

(72) Inventors: Deepaganesh Paulraj, Bangalore (IN); Lee E. Ballard, Georgetown, TX (US); Elie Antoun Jreij, Pflugerville, TX (US); Akkiah Choudary Maddukuri, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 49 days.

(21) Appl. No.: 17/728,636

(22) Filed: Apr. 25, 2022

(65) Prior Publication Data

US 2023/0342475 A1 Oct. 26, 2023

(51) Int. Cl.
*G06F 21/57* (2013.01)

(52) U.S. Cl.
CPC .......... *G06F 21/575* (2013.01); *G06F 21/572* (2013.01)

(58) Field of Classification Search
CPC ....... G06F 21/575; G06F 21/572; G06F 21/33
See application file for complete search history.

(56) References Cited

U.S. PATENT DOCUMENTS

| | | | | |
|---|---|---|---|---|
| 2006/0064619 A1* | 3/2006 | Wen | .......................... | G06F 9/50 |
| | | | | 714/734 |
| 2015/0193620 A1* | 7/2015 | Khatri | .................... | G06F 21/575 |
| | | | | 713/2 |
| 2019/0103972 A1* | 4/2019 | Pope | ...................... | H04L 9/0894 |
| 2020/0310824 A1* | 10/2020 | Atta | ......................... | H04L 9/3247 |
| 2022/0100491 A1* | 3/2022 | Voltz | .......................... | G06F 8/65 |
| 2023/0069485 A1* | 3/2023 | Huruli | ................... | G06F 21/572 |

* cited by examiner

*Primary Examiner* — Hyun Soo Kim
(74) *Attorney, Agent, or Firm* — Jackson Walker L.L.P.

(57) ABSTRACT

An information handling system may include a management controller configured to provide out-of-band management of the information handling system, and a network interface controller comprising a network interface controller storage resource. The management controller may be configured to: receive an update bundle cryptographically signed by a manufacturer of the information handling system, wherein the update bundle includes at least one signature associated with a network interface controller operating system (OS) configured to be executed by the network interface controller; and transmit the at least one signature to the network interface controller. The network interface controller may be configured to install the network interface controller OS to the network interface controller storage resource based on the at least one signature.

9 Claims, 3 Drawing Sheets

SMART NETWORK INTERFACE CONTROLLER SIGNATURE DATABASE EMULATION

TECHNICAL FIELD

The present disclosure relates in general to information handling systems, and more particularly to methods and systems for managing signatures in a smart network interface controller.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In some computing applications, an information handling system may include a hypervisor for hosting one or more virtual resources such as virtual machines (VMs). A hypervisor may comprise software and/or firmware generally operable to allow multiple virtual machines and/or operating systems to run on a single information handling system at the same time. This operability is generally allowed via virtualization, a technique for hiding the physical characteristics of computing system resources (e.g., physical hardware of the computing system) from the way in which other systems, applications, or end users interact with those resources. Thus, a virtual machine may comprise any program of executable instructions, or aggregation of programs of executable instructions, configured to execute a guest operating system on a hypervisor or host operating system in order to act through or in connection with the hypervisor/host operating system to manage and/or control the allocation and usage of hardware resources such as memory, central processing unit time, disk space, and input and output devices, and provide an interface between such hardware resources and application programs hosted by the guest operating system.

In other applications, an information handling system may be used in a "bare metal" configuration in which only one operating system is installed, and the hypervisor and virtual resources are not needed.

In either scenario, a network interface of the information handling system may comprise a smart network interface card or "SmartNIC" and/or a data processing unit (DPU), which may offer capabilities not found in traditional NICs.

For purposes of this disclosure, the terms "SmartNIC" and "DPU" may be used interchangeably. Further, it should be noted that some embodiments may operate on devices other than SmartNICs. For example, graphics processing units (GPUs), infrastructure processing units (IPUs), and other types of accelerators and smart devices may benefit from the teachings of this disclosure. For the sake of clarity and concreteness, the SmartNIC example will be discussed in detail herein, but one of ordinary skill in the art with the benefit of this disclosure will understand its application to such other devices.

A SmartNIC may act as a system within a system, including its own Unified Extensible Firmware Interface Basic Input/Output System (UEFI BIOS), its own operating system (OS) such as ESXio or any other suitable OS, and/or its own management controller such as a baseboard management controller (BMC).

In some implementations, an industry standard set of cryptographic certificates and/or signatures may be installed to a SmartNIC in the factory environment along with the SmartNIC OS and a standard Secure Boot policy. (For purposes of this disclosure, the terms "certificate" and "signature" may be used interchangeably.) Because the Secure Boot certificates are "generic" in this situation, any one of a standard set of OSes can later be imaged onto the SmartNIC, which can be a security concern in some situations.

Accordingly, it is advantageous to be able to deploy custom certificates and a custom policy to a SmartNIC in order to improve its security. In this situation, only those OSes that have been specifically authorized can be installed onto the SmartNIC, instead of any OS image that has been signed by any of the standard certificates.

However, the SmartNIC in an information handling system may not have direct access to that system's Secure Boot certificate management system. Accordingly, embodiments may allow for provisioning of SmartNIC Secure Boot signatures by emulating the signature database via a management controller.

The example of UEFI Secure Boot signatures is discussed in detail herein for the sake of concreteness and clarity. One of ordinary skill in the art with the benefit of this disclosure will understand its applicability to other types of certificates and signatures as well.

It should be noted that the discussion of a technique in the Background section of this disclosure does not constitute an admission of prior-art status. No such admissions are made herein, unless clearly and unambiguously identified as such.

SUMMARY

In accordance with the teachings of the present disclosure, the disadvantages and problems associated with certificate management on a SmartNIC may be reduced or eliminated.

In accordance with embodiments of the present disclosure, an information handling system may include a management controller configured to provide out-of-band management of the information handling system, and a network interface controller comprising a network interface controller storage resource. The management controller may be configured to: receive an update bundle cryptographically signed by a manufacturer of the information handling system, wherein the update bundle includes at least one signature associated with a network interface controller OS configured to be executed by the network interface controller; and transmit the at least one signature to the network interface controller. The network interface controller may be configured to install the network interface controller OS to the network interface controller storage resource based on the at least one signature.

In accordance with these and other embodiments of the present disclosure, a method may include, in an information handling system including a management controller and a network interface controller that includes a network interface controller storage resource: the management controller receiving an update bundle cryptographically signed by a manufacturer of the information handling system, wherein the update bundle includes at least one signature associated with a network interface controller OS configured to be executed by the network interface controller; the management controller transmitting the at least one signature to the network interface controller; and the network interface controller installing the network interface controller OS to the network interface controller storage resource based on the at least one signature.

In accordance with these and other embodiments of the present disclosure, an article of manufacture may include a non-transitory, computer-readable medium having instructions thereon that are executable by at least one processor of a management controller of an information handling system for: receiving an update bundle cryptographically signed by a manufacturer of the information handling system, wherein the update bundle includes at least one signature associated with a network interface controller OS configured to be executed by a network interface controller of the information handling system; and transmitting the at least one signature to the network interface controller; wherein the network interface controller is configured to install the network interface controller OS to a network interface controller storage resource thereof based on the at least one signature.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
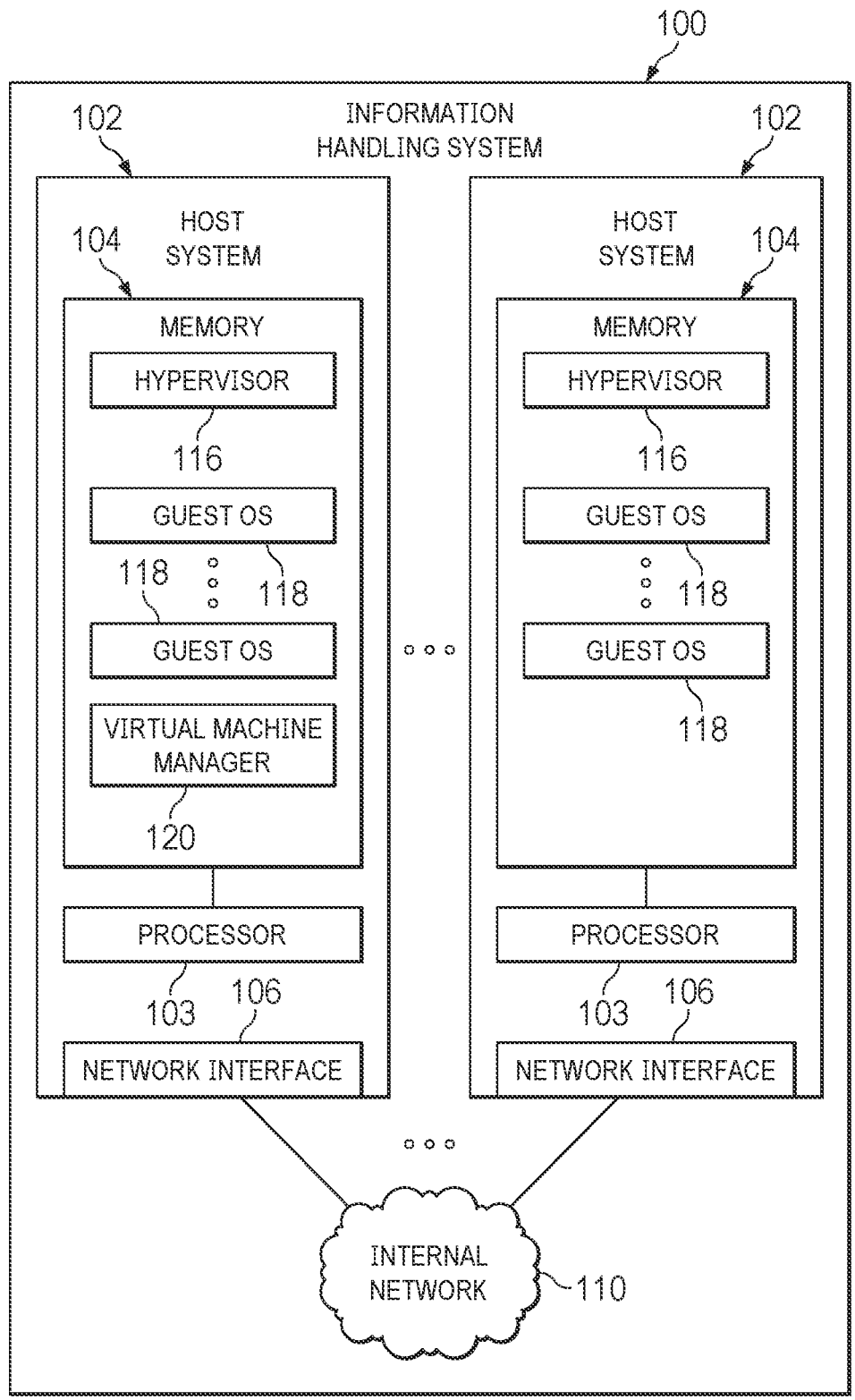
FIG. 1 illustrates a block diagram of selected components of an example information handling system, in accordance with embodiments of the present disclosure.
Figure 2:
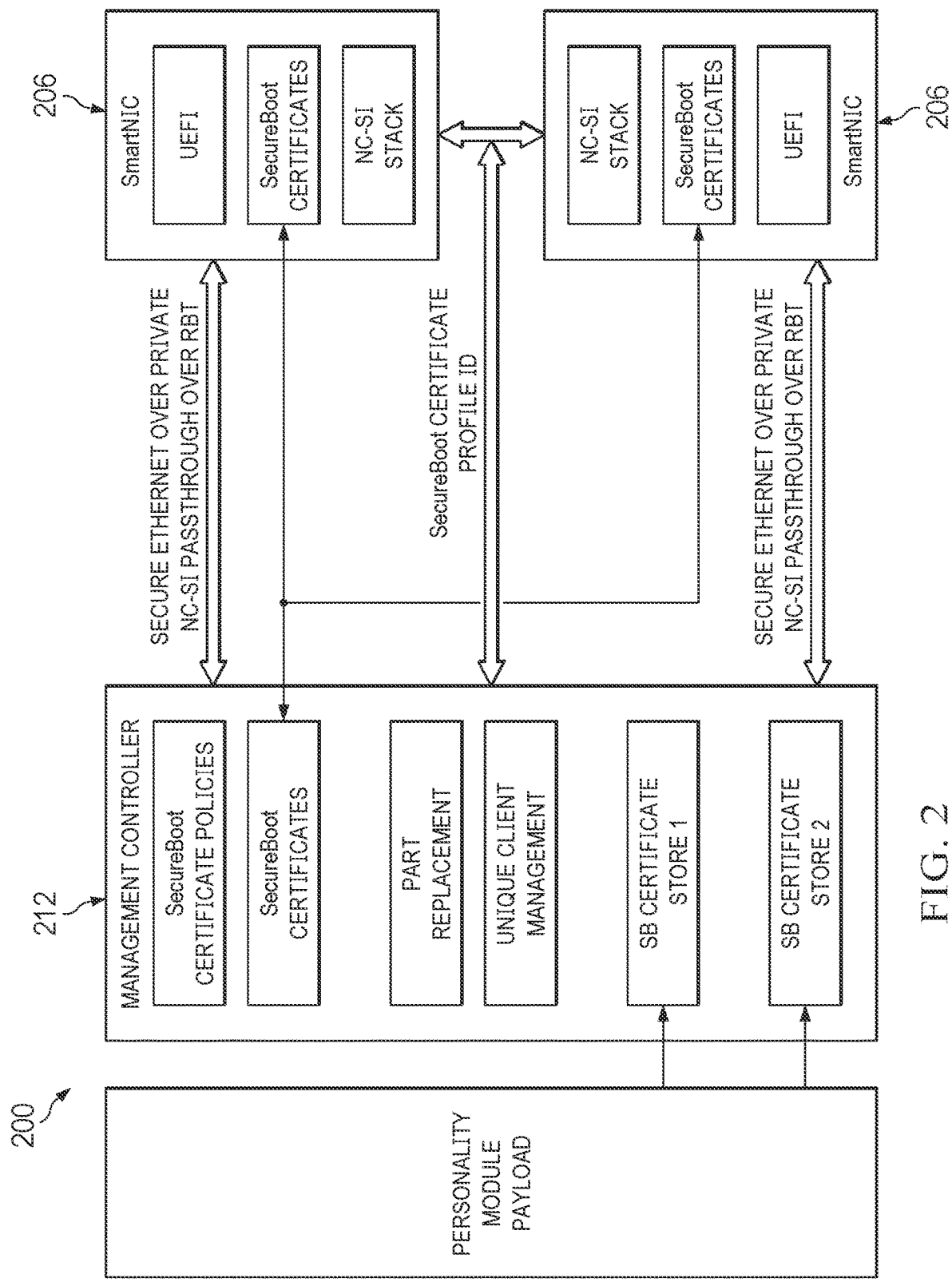
FIG. 2 illustrates a block diagram of selected components of an example information handling system, in accordance with embodiments of the present disclosure.
Figure 3:
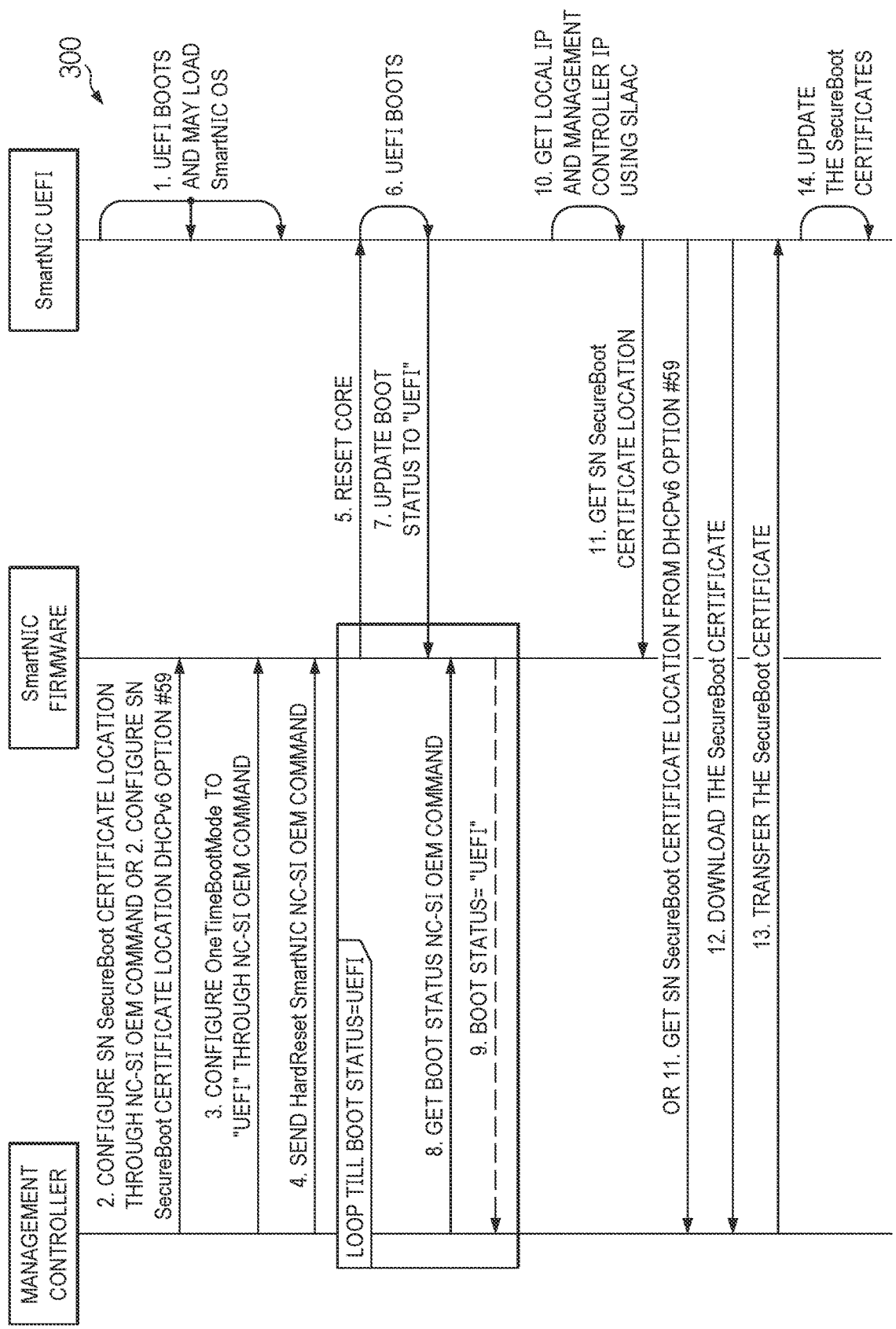
FIG. 3 illustrates an example sequence diagram, in accordance with embodiments of the present disclosure.

Preferred embodiments and their advantages are best understood by reference to FIGS. 1 through 3, wherein like numbers are used to indicate like and corresponding parts.

For the purposes of this disclosure, the term "information handling system" may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For purposes of this disclosure, when two or more elements are referred to as "coupled" to one another, such term indicates that such two or more elements are in electronic communication or mechanical communication, as applicable, whether connected directly or indirectly, with or without intervening elements.

When two or more elements are referred to as "coupleable" to one another, such term indicates that they are capable of being coupled together.

For the purposes of this disclosure, the term "computer-readable medium" (e.g., transitory or non-transitory computer-readable medium) may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; communications media such as wires, optical fibers, microwaves, radio waves, and other electromagnetic and/or optical carriers; and/or any combination of the foregoing. Physical computer-readable media such as disk drives, solid-state drives, non-volatile memory, etc. may also be referred to herein as "physical storage resources."

For the purposes of this disclosure, the term "information handling resource" may broadly refer to any component system, device, or apparatus of an information handling system, including without limitation processors, service processors, basic input/output systems, buses, memories, I/O devices and/or interfaces, storage resources, network interfaces, motherboards, and/or any other components and/or elements of an information handling system.

For the purposes of this disclosure, the term "management controller" may broadly refer to an information handling system that provides management functionality (typically out-of-band management functionality) to one or more other information handling systems. In some embodiments, a management controller may be (or may be an integral part of) a service processor, a baseboard management controller (BMC), a chassis management controller (CMC), or a remote access controller (e.g., a Dell Remote Access Controller (DRAC) or Integrated Dell Remote Access Controller (iDRAC)).

FIG. 1 illustrates a block diagram of selected components of an example information handling system 100 having a plurality of host systems 102, in accordance with embodiments of the present disclosure. As shown in FIG. 1, information handling system 100 may include a plurality of host systems 102 coupled to one another via an internal network 110.

In some embodiments, information handling system 100 may include a single chassis housing a plurality of host systems 102. In other embodiments, information handling system 100 may include a cluster of multiple chassis, each with one or more host systems 102. In yet other embodiments, host systems 102 may be entirely separate information handling systems, and they may be coupled together via an internal network or an external network such as the Internet.

In some embodiments, a host system 102 may comprise a server (e.g., embodied in a "sled" form factor). In these and other embodiments, a host system 102 may comprise a personal computer. In other embodiments, a host system 102 may be a portable computing device (e.g., a laptop, notebook, tablet, handheld, smart phone, personal digital assistant, etc.). As depicted in FIG. 1, information handling system 100 may include a processor 103, a memory 104 communicatively coupled to processor 103, and a network interface 106 communicatively coupled to processor 103. For the purposes of clarity and exposition, in FIG. 1, each host system 102 is shown as comprising only a single processor 103, single memory 104, and single network interface 106. However, a host system 102 may comprise any suitable number of processors 103, memories 104, and network interfaces 106.

A processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in a memory 104 and/or other computer-readable media accessible to processor 103.

A memory 104 may be communicatively coupled to a processor 103 and may include any system, device, or apparatus configured to retain program instructions and/or data for a period of time (e.g., computer-readable media). A memory 104 may include RAM, EEPROM, a PCMCIA card, flash memory, magnetic storage, opto-magnetic storage, or any suitable selection and/or array of volatile or non-volatile memory that retains data after power to information handling system 100 is turned off.

As shown in FIG. 1, a memory 104 may have stored thereon a hypervisor 116 and one or more guest operating systems (OS) 118. In some embodiments, hypervisor 116 and one or more of guest OSes 118 may be stored in a computer-readable medium (e.g., a local or remote hard disk drive) other than a memory 104 which is accessible to processor 103. Each guest OS 118 may also be referred to as a "virtual machine."

A hypervisor 116 may comprise software and/or firmware generally operable to allow multiple virtual machines and/or operating systems to run on a single computing system (e.g., an information handling system 100) at the same time. This operability is generally allowed via virtualization, a technique for hiding the physical characteristics of computing system resources (e.g., physical hardware of the computing system) from the way in which other systems, applications, or end users interact with those resources. A hypervisor 116 may be one of a variety of proprietary and/or commercially available virtualization platforms, including without limitation, VIRTUALLOGIX VLX FOR EMBEDDED SYSTEMS, IBM's Z/VM, XEN, ORACLE VM, VMWARE's ESX SERVER, L4 MICROKERNEL, TRANGO, MICROSOFT's HYPER-V, SUN's LOGICAL DOMAINS, HITACHI's VIRTAGE, KVM, VMWARE SERVER, VMWARE WORKSTATION, VMWARE FUSION, QEMU, MICROSOFT's VIRTUAL PC and VIRTUAL SERVER, INNOTEK's VIRTUALBOX, and SWSOFT's PARALLELS WORKSTATION and PARALLELS DESKTOP.

In one embodiment, a hypervisor 116 may comprise a specially-designed OS with native virtualization capabilities. In another embodiment, a hypervisor 116 may comprise a standard OS with an incorporated virtualization component for performing virtualization.

In another embodiment, a hypervisor 116 may comprise a standard OS running alongside a separate virtualization application. In this embodiment, the virtualization application of the hypervisor 116 may be an application running above the OS and interacting with computing system resources only through the OS. Alternatively, the virtualization application of a hypervisor 116 may, on some levels, interact indirectly with computing system resources via the OS, and, on other levels, interact directly with computing system resources (e.g., similar to the way the OS interacts directly with computing system resources, or as firmware running on computing system resources). As a further alternative, the virtualization application of a hypervisor 116 may, on all levels, interact directly with computing system resources (e.g., similar to the way the OS interacts directly with computing system resources, or as firmware running on computing system resources) without utilizing the OS, although still interacting with the OS to coordinate use of computing system resources.

As stated above, a hypervisor 116 may instantiate one or more virtual machines. A virtual machine may comprise any program of executable instructions, or aggregation of programs of executable instructions, configured to execute a guest OS 118 in order to act through or in connection with a hypervisor 116 to manage and/or control the allocation and usage of hardware resources such as memory, CPU time, disk space, and input and output devices, and provide an interface between such hardware resources and application programs hosted by the guest OS 118. In some embodiments, a guest OS 118 may be a general-purpose OS such as WINDOWS or LINUX, for example. In other embodiments, a guest OS 118 may comprise a specific- and/or limited-purpose OS, configured so as to perform application-specific functionality (e.g., persistent storage).

At least one host system 102 in information handling system 100 may have stored within its memory 104 a virtual machine manager 120. A virtual machine manager 120 may comprise software and/or firmware generally operable to manage individual hypervisors 116 and the guest OSes 118 instantiated on each hypervisor 116, including controlling migration of guest OSes 118 between hypervisors 116. Although FIG. 1 shows virtual machine manager 120 instantiated on a host system 102 on which a hypervisor 116 is also instantiated, in some embodiments virtual machine manager 120 may be instantiated on a dedicated host system 102 within information handling system 100, or a host system 102 of another information handling system 100.

A network interface 106 may include any suitable system, apparatus, or device operable to serve as an interface between an associated information handling system 100 and internal network 110. A network interface 106 may enable its associated information handling system 100 to communicate with internal network 110 using any suitable transmission protocol (e.g., TCP/IP) and/or standard (e.g., IEEE 802.11, Wi-Fi). In certain embodiments, a network interface 106 may include a physical network interface card (NIC). In the same or alternative embodiments, a network interface 106 may be configured to communicate via wireless transmissions. In the same or alternative embodiments, a network interface 106 may provide physical access to a networking medium and/or provide a low-level addressing system (e.g., through the use of Media Access Control addresses). In some embodiments, a network interface 106 may be implemented as a local area network ("LAN") on motherboard ("LOM") interface. A network interface 106 may comprise one or more suitable NICs, including without limitation, mezzanine cards, network daughter cards, etc.

In some embodiments, a network interface 106 may comprise a SmartNIC and/or a DPU. In addition to the stateful and custom offloads a SmartNIC or DPU may provide, it may have an independent management domain with a separate operating system, independent credentials, and independent remote access. Accordingly, network interface 106 may include its own specialized processor and memory.

In addition to processor 103, memory 104, and network interface 106, a host system 102 may include one or more other information handling resources.

Internal network 110 may be a network and/or fabric configured to communicatively couple information handling systems to each other. In certain embodiments, internal network 110 may include a communication infrastructure, which provides physical connections, and a management layer, which organizes the physical connections of host systems 102 and other devices coupled to internal network 110. Internal network 110 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or any other appropriate architecture or system that facilitates the communication of signals, data and/or messages (generally referred to as data). Internal network 110 may transmit data using any storage and/or communication protocol, including without limitation, Fibre Channel, Fibre Channel over Ethernet (FCoE), Small Computer System Interface (SCSI), Internet SCSI (iSCSI), Frame Relay, Ethernet Asynchronous Transfer Mode (ATM), Internet protocol (IP), or other packet-based protocol, and/or any combination thereof. Network 110 and its various components may be implemented using hardware, software, or any combination thereof.

As discussed above, embodiments of this disclosure may provide techniques for provisioning SmartNIC Secure Boot signatures by emulating a signature database via a management controller.

Turning now to FIG. 2, a block diagram of selected components of an information handling system 200 is shown, according to some embodiments. Information handling system 200 may include a host system (not shown), a management controller 212, and one or more SmartNICs 206. The host system may be coupled to the hardware of SmartNICs 206 via a communication channel such as Peripheral Component Interconnect Express (PCIe) in some embodiments.

Management controller 212 may be coupled to SmartNICs 206 via a network controller sideband interface (NC-SI), which may be established over reduced media-independent interface (RMII) based transport (RBT), over PCIe vendor-defined message (VDM), over SMBus, etc.

Management controller 212 may include the ability to update an identity module (also referred to as a personality module) of information handling system 200. As one of ordinary skill in the art with the benefit of this disclosure will understand, identity modules are generally used to allow for rebranding, customization, and maintenance of information handling systems. The identity module update feature may be leveraged to support the upgrades to the Secure Boot certificate database of SmartNICs 206 by embedding Secure Boot certificate content and the associated SmartNIC identity (e.g., a PCI ID, a unique serial number, a fully qualified device descriptor (FQDD), etc.) as part of the identity module payload.

This arrangement may be implemented based on the preexisting trust relationship between SmartNICs 206 and management controller 212. That is, SmartNICs 206 may by default trust any content provided by management controller 212, and management controller 212 may by default trust any content that is cryptographically signed by a manufacturer of information handling system 200. Accordingly, if it is desired to allow a SmartNIC 206 to install a new OS, then an identity module update bundle payload may be provided and signed by the manufacturer of information handling system 200 to allow such an installation. That payload may include a corresponding cryptographic signature (e.g., a signature associated with the provider of the new OS). Management controller 212 may trust the payload because it is signed by the manufacturer of information handling system 200, and SmartNICs 206 may trust the payload because it is provided by management controller 212.

In various embodiments, an administrator may wish for the Secure Boot certificates of SmartNICs 206 to behave in different ways if components are moved from one information handling system to another (e.g., if a SmartNIC 206 is removed from information handling system 200 and installed in a different system). For example, management controller 212 may implement a Secure Boot certificate policy such that the installed certificates can be tied to information handling system 200 or such that they can follow the SmartNIC. In some embodiments, this policy setting may be configurable by an administrator of information handling system 200.

If the Secure Boot certificates are to remain with information handling system 200, then management controller 212 may store the set of Secure Boot certificates from the identity module, exposing them to the respective SmartNIC (and if a new SmartNIC is installed in information handling system 200, then to that new SmartNIC as well).

If, on the other hand, the certificates are to follow the SmartNIC, then after the SmartNIC is moved, the certificates may be read from the SmartNIC by the management controller of the new system and overwritten onto the storage of the new management controller. If desired, then those certificates may also be provided to any other SmartNICs in the new system.

In some embodiments, management controller 212 may also configure a certificate policy differently depending on whether certificates are managed by an installer of the new SmartNIC OS or by the management controller itself. If managed by the installer, then management controller 212 may expose an application programming interface (API) to allow the installer to upload the new set of Secure Boot certificates. For example, this may be implemented as a Redfish PATCH API. On the other hand, if certificates are managed by management controller 212 itself, then management controller 212 may expose a read-only API (e.g., a Redfish GET API) for the installer to access. Management controller 212 may apply a pre-configured/pre-associated set of Secure Boot certificates based on a selective Secure Boot certificate profile ID.

Turning now to FIG. 3, a sequence diagram flow chart is shown of an example method 300 for managing certificates in a SmartNIC, in accordance with some embodiments.

As shown, at step 1, the SmartNIC UEFI may boot and load a SmartNIC OS. The management controller may configure the SmartNIC Secure Boot certificate location at step 2, either through an NC-SI OEM command or via DHCPv6 option #59.

At steps 3 and 4, the management controller may configure the SmartNIC to UEFI boot one time, then issue a hard reset to cause it to reboot. The SmartNIC may then proceed to a UEFI boot, and at step 10 it may determine a local IP address and a management controller IP address using IPv6 Stateless Address Auto Configuration (SLAAC).

At steps 11 through 14, the SmartNIC may determine the location of the SmartNIC Secure Boot certificates, download the certificates, and update its internal storage with the updated set of certificates.

One of ordinary skill in the art with the benefit of this disclosure will understand that the preferred initialization point for the method depicted in FIG. 3 and the order of the steps comprising that method may depend on the implementation chosen. In these and other embodiments, this method may be implemented as hardware, firmware, software, applications, functions, libraries, or other instructions. Further, although FIG. 3 discloses a particular number of steps to be taken with respect to the disclosed method, the method may be executed with greater or fewer steps than depicted. The method may be implemented using any of the various components disclosed herein, and/or any other system operable to implement the method.

In one embodiment, method 300 may use a direct HTTP implementation. For example, the management controller may publish a file such as a JSON file at the DHCPv6 option #59 Bootfile URL indicating the set of Secure Boot certificates. The management controller may then store a back-up indication of the current boot mode of the SmartNIC (e.g., SmartNIC OS vs. UEFI) to be restored later, then configure the SmartNIC to boot into the SmartNIC UEFI and trigger a reboot. The SmartNIC UEFI may then boot and retrieve the JSON file.

The SmartNIC UEFI boot may then persist the JSON file (e.g., by storing it in the SmartNIC's non-volatile memory). The SmartNIC may send an NC-SI OEM asynchronous event notification (AEN) regarding whether or not the UEFI configuration has been stored successfully, or an error status if an error occurs. The management controller may wait for the NC-SI OEM AEN indicating that the UEFI configuration has been stored successfully.

The management controller may then clear the DHCPv6 option #59 and restore the boot mode that was previously backed up.

In another embodiment, method 300 may use a Redfish implementation. For example, on every reboot of the SmartNIC, a SmartNIC UEFI Redfish client may retrieve the SmartNIC Secure Boot certificates from the management controller using a Redfish GET API. For example, the client may retrieve various items of information based on the certificate type, such as a platform key (PK), a key exchange key (KEK), a signature database (DB), a forbidden signature database (DBx), etc.

The SmartNIC UEFI may then compare the Secure Boot certificate content against its local configuration. If there are any differences, then the local configuration may be updated to conform to the information supplied by the management controller.

Accordingly, embodiments of this disclosure allow for a management controller to act as a UEFI signature data store for a SmartNIC. Secure Boot certificates may be upgraded (e.g., by adding, deleting, and/or replacing certificates) using the management controller's identity module, which is secure and controlled. Upon every boot, the SmartNIC UEFI may get the current set of certificates and perform suitable updates (e.g., if any certificates have expired, or any new certificates have been added, etc.).

Although various possible advantages with respect to embodiments of this disclosure have been described, one of ordinary skill in the art with the benefit of this disclosure will understand that in any particular embodiment, not all of such advantages may be applicable. In any particular embodiment, some, all, or even none of the listed advantages may apply.

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

Unless otherwise specifically noted, articles depicted in the drawings are not necessarily drawn to scale. However, in some embodiments, articles depicted in the drawings may be to scale.

Further, reciting in the appended claims that a structure is "configured to" or "operable to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke § 112(f) during prosecution, Applicant will recite claim elements using the "means for [performing a function]" construct.

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could be made hereto without departing from the spirit and scope of the disclosure.

What is claimed is:

1. An information handling system comprising:
a management controller configured to provide out-of-band management of the information handling system; and
a network interface controller comprising a network interface controller storage resource;
wherein the management controller is configured to:
receive an update bundle cryptographically signed by a manufacturer of the information handling system, wherein the update bundle includes at least one signature associated with a network interface controller operating system (OS) configured to be executed by the network interface controller, and wherein the update bundle is an identity module update bundle associated with rebranding and/or customization of the information handling system;
transmit the at least one signature to the network interface controller; and
responsive to the network interface controller being removed from the information handling system and installed in a different information handling system, implement a user-configurable policy setting regarding management of the at least one signature, wherein the user-configurable policy setting directs the at least one signature to remain with the information handling system or to follow the network interface controller to the different information handling system; and
wherein the network interface controller is configured to install the network interface controller OS to the network interface controller storage resource based on the at least one signature.

2. The information handling system of claim 1, wherein the network interface controller is a SmartNIC.

3. The information handling system of claim 1, wherein the at least one signature is a Secure Boot signature.

4. A method comprising, in an information handling system including a management controller configured to provide out-of-band management of the information handling system and a network interface controller that includes a network interface controller storage resource:
the management controller receiving an update bundle cryptographically signed by a manufacturer of the information handling system, wherein the update bundle includes at least one signature associated with a network interface controller operating system (OS) configured to be executed by the network interface controller, and wherein the update bundle is an identity module update bundle associated with rebranding and/or customization of the information handling system;
the management controller transmitting the at least one signature to the network interface controller;
the management controller, responsive to the network interface controller being removed from the information handling system and installed in a different information handling system, implementing a user-configurable policy setting regarding management of the at least one signature, wherein the user-configurable policy setting directs the at least one signature to remain with the information handling system or to follow the network interface controller to the different information handling system; and
the network interface controller installing the network interface controller OS to the network interface controller storage resource based on the at least one signature.

5. The method of claim 4, wherein the network interface controller is a SmartNIC.

6. The method of claim 4, wherein the at least one signature is a Secure Boot signature.

7. An article of manufacture comprising a non-transitory, computer-readable medium having instructions thereon that are executable by at least one processor of a management controller of an information handling system for:
receiving an update bundle cryptographically signed by a manufacturer of the information handling system, wherein the update bundle includes at least one signature associated with a network interface controller operating system (OS) configured to be executed by a network interface controller of the information handling system, and wherein the update bundle is an identity module update bundle associated with rebranding and/or customization of the information handling system; and
transmitting the at least one signature to the network interface controller; and
responsive to the network interface controller being removed from the information handling system and installed in a different information handling system, implementing a user-configurable policy setting regarding management of the at least one signature, wherein the user-configurable policy setting directs the at least one signature to remain with the information handling system or to follow the network interface controller to the different information handling system; and
wherein the network interface controller is configured to install the network interface controller OS to a network interface controller storage resource thereof based on the at least one signature.

8. The article of claim 7, wherein the network interface controller is a SmartNIC.

9. The article of claim 7, wherein the at least one signature is a Secure Boot signature.

* * * * *